Nov. 12, 1957 A. W. BLOW 2,813,152
TELEPHONE INTERCOMMUNICATION SYSTEM
Filed May 23, 1956
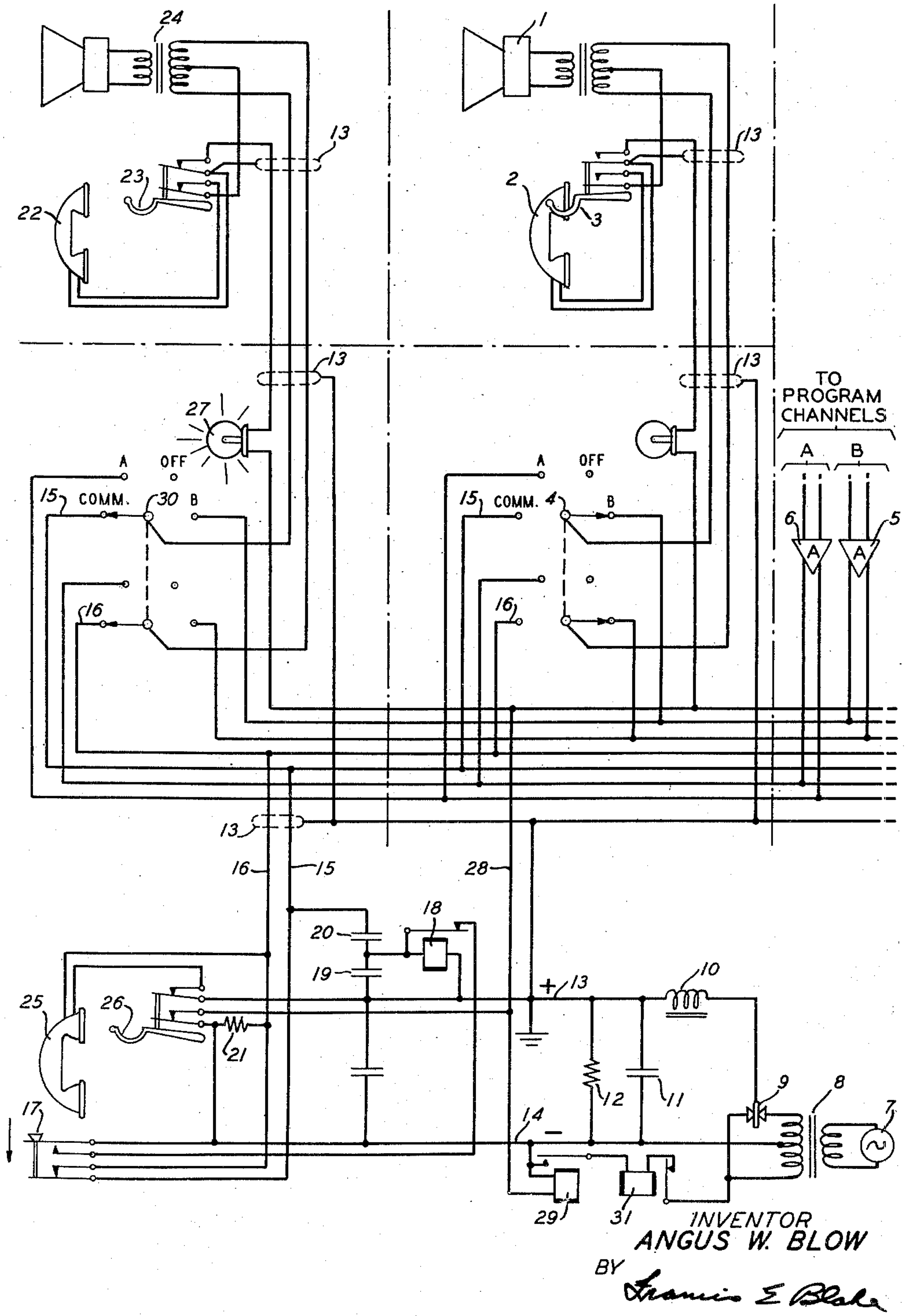
INVENTOR
ANGUS W. BLOW
BY Francis E Blake
ATTORNEY United States Patent Office 2,813,152

Patented Nov. 12, 1957

2,813,152

TELEPHONE INTERCOMMUNICATION SYSTEM

Angus W. Blow, Rochester, N. Y., assignor to General Dynamics Corporation, Rochester, N. Y., a corporation of Delaware Application May 23, 1956, Serial No. 586,732

5 Claims. (Cl. 179—1)

This invention relates to telephone communication systems and particularly to means for intercommunication between a master station and any one of several substations.

The object of the invention is to provide a combination program distribution and telephone intercommunication system in which the loudspeakers used for program distribution may also function as call signal devices for the intercommunication system.

In accordance with the present invention a multi-purpose communication system is provided employing a minimum of wiring together with simple and rugged components. A master or central station is provided together with a plurality of distant stations each equipped with a loudspeaker and a telephone and its hookswitch. The loudspeakers are normally connected to a program distribution channel over which any type of voice currents may be continuously or intermittently transmitted. If the person at such a substation wishes telephone communication with the master station he merely lifts his telephone from its hookswitch whereupon an annunciator lamp individual to his line and a buzzer common to all such lines operate to attract the attention of the central station attendant. The attendant then operates a switch individual to the calling line, thus cutting the loudspeaker off from the program distribution channel and using the two loudspeaker wires in parallel as one conductor of a telephone line.

When the attendant at the central station wishes to call a person at a particular substation, he operates the individual switch for that station and presses a call button. This call button removes a normal short circuit connection across the loudspeaker channel and starts a buzzer which thereupon transmits a calling signal over the loudspeaker wires to call the wanted person. The annunciator lamp will light when the called party answers.

To provide this service it is only necessary to use a three wire shielded cable running to each station, two wires being used for the loudspeaker, a third for the annunciator and the shield as a ground return.

A feature of the invention is a circuit arrangement by which the loudspeaker when connected for intercommunication service is short circuited whereby conversation cannot be picked up by the microphone characteristics thereof and transmitted to other points.

Another feature of the invention is a circuit arrangement for minimizing the volume of calling signal current which might be transmitted into the telephone channel should the subscriber complete his telephone connection while the calling signal is still being transmitted from the central station. The tone or buzzing signal is mainly transmitted over the two loudspeaker wires to the loudspeaker and thence through a network in which the telephone instruments are in parallel with each other and in parallel with a low impedance circuit. Through a simplexed connection of the telephone to the loudspeaker wires it will be noted that any signaling current transmitted to the loudspeaker which enters the telephone channel will be a minute current so that the volume of this current heard over the telephones will be limited and neither unpleasant to the telephone listener nor injurious to the carbon button of the telephone transmitter.

Another feature of the invention is the use of a simplex connection to the loudspeaker wires for the telephone circuit and a complete short circuit of these wires at the other end, whereby voice currents from the telephone channel are prevented from reaching the loudspeaker both by the cancelling action of the simplex coils at the loudspeaker end and the complete short circuit at the other end.

Other features will appear hereinafter.

The drawings consist of a single sheet having one figure in the form of a schematic circuit diagram, showing a power supply, a central station telephone call button and two extension line switches and associated annunciator lamps, and as indicated at distant points, two extension stations.

One extension station, that shown to the right and being equipped with a loudspeaker 1, a telephone 2, and its hookswitch 3, is shown in normal condition, that is with the individual selector switch 4 at the central station console set so that the program channel B, fed through the amplifier 5 is connected to the loudspeaker 1. Thus, in the absence of a need for telephonic communication, the loudspeaker may be used for program distribution. Alternatively, the individual at this station may instruct the attendant at the console to set his station (by he selective switch 4) either to some other program channel, such as channel A supplied through amplifier 6, or to an Off condition.

The power for operating this system is supplied by a conventional power pack consisting of a source of alternating current 7 connected to a transformer 8, and fed through a rectifier 9, and a smoothing circuit including the impedance coil 10, the condenser 11, and the resistance 12, to a grounded positive terminal 13 and a negative terminal 14.

When the attendant wishes to get into communication with the individual at a distant station, the attendant will set the selective switch as shown in the example to the left so that the loudspeaker is connected to the two common wires 15 and 16. The attendant then operates the call button 17 whereupon a circuit is established from the negative power terminal 14, the upper pair of contacts of the button 17, the back contact, armature and winding of the relay 18 and thence to the ground terminal 13. The resulting buzzing operation of the relay 18, transmits a buzzing or tone from ground, the two condensers 19 and 20, the common conductor 15, through the loudspeaker, such as 1, the common conductor 16, the resistance 21 to the negative power terminal 14.

The buzz or tone is transmitted as a call signal, and the individual at the called station responds by lifting the telephone from its hook (as shown by the telephone 22 and its hookswitch 23). If this operation takes place while the button 17 is still depressed a small current will flow from ground 13, through the telephone 22, the lower set of contacts of the hookswitch 23, the mid-tap of the loudspeaker transformer 24, and thence through the two loudspeaker wires 15 and 16 to the tone source. Due to the transformer 24, the amount of this current is very small and will be neither unpleasant to the listener through the telephone 22 nor injurious to the transmitter of this telephone.

Under other circumstances, when the telephone 22 is lifted from its hookswitch after the button 17 has been restored, a talking circuit will be established from ground 13, the telephone 22, the lower contacts of the hookswitch 23, the mid-tap of the transformer 24 thence over the two wires 15 and 16 now solidly connected together by the lower contacts of the button 17, the telephone 25, the upper contacts of the hookswitch 26, to ground. Power for the operation of the telehpones is connected from ground, the output of the power pack to the negative terminal 14, the resistance 21 and thence through the two telephones in parallel to ground.

During the existence of this connection, a circuit may be traced from ground, the upper contacts of the hookswitch 23, the annunciator lamp 27, the common conductor 28 and thence through the lower section of switch 26 to the negative terminal 14 and through the relay 29 to this negative terminal 14. The resistance 21 shunting the winding of the relay 21 while the telephone 25 is off the hookswitch 26, prevents the operation of the relay 29. The annunciator 29 will glow as long as the telephone 22 is off its hookswitch 23, thus signaling the attendant that this condition exists.

When a call is made in the other direction, that is the telephone 22 is lifted first, and when the switch 30 is set at any point, the resistance will not be in shunt of the relay 29 and hence this relay will operate thus providing an obvious circuit for the buzzer 31 which will operate until the attendant responds and lifts the telephone 25 from the hookswitch 26.

It is believed that it will be obvious that should both switches 4 and 30 be set at the communication point (such as shown in the example of switch 30) that due to the short-circuiting of the loudspeaker wires 15 and 16 by the lower contacts of the call button 17 neither loudspeaker can, through its microphonic capabilities, transmit any conversation from one station to another.

What is claimed is:

1. A communication system, having a master station and a plurality of substations, each said substation having a loudspeaker, and a telephone, including a telephone set and a hookswitch therefor, said master station having a switch individual to each said substation, said switch having means to switch two conductors leading from said loudspeaker into various networks including one or more program distribution channels and a telephone network connected to a master station telehpone set, means in said last connection for normally short-circuiting said loudspeaker and a calling device for removing said normal short circuit and connecting a source of calling current thereto.

2. In a communication system, a distant station including a loudspeaker, and a telephone set including a transmitter, a receiver and a hookswitch, a three conductor line leading to said station having ground return connections constituting a fourth conductor, two of said conductors being connected to said loudspeaker, means for normally short-circuiting said loudspeakers and connecting said telephone between said ground connection and said parallel connected loudspeaker wires, and signaling means comprising means for opening said normal loudspeaker short-circuiting connection and connecting a signaling current to said loudspeaker wires.

3. In a communication system, a distant station having a loudspeaker and a telephone set, a circuit for said loudspeaker comprising a pair of wires and a circuit for said telephone set comprising a simplex connection to said loudspeaker wires, means for normally switching said loudspeaker wires to a program distribution circuit and alternatively to a telephone network and means in said telephone network for normally connecting said loudspeaker wires together to short-circuit said loudspeaker.

4. In a communication system, a master station and a plurality of distant stations, each said distant stations having a loudspeaker, a telephone comprising a transmitter and a receiver in series and a hookswitch for said telephone, a pair of wires extending from said master station to each of said distant stations and terminating in a transformer winding having a mid-tap leading through said hookswitch to said telephone, said transformer winding being coupled to another transformer winding leading to said loudspeaker, calling means at said master station for connecting a source of signaling current to said loudspeaker wires and alternatively to connect said loudspeaker wires together.

5. In a communication system, a master station and a plurality of distant stations, each said distant station having a loudspeaker, a telephone comprising a transmitter and a receiver in series and a hookswitch for said telephone, a pair of wires extending from said master station to each of said distant stations and terminating in a transformer winding having a mid-tap leading through said hookswitch to said telephone, means at said master station for transmitting signaling current over said two loudspeaker wires, said telephone connection providing a minute current path for said loudspeaker signaling current whereby signaling may be heard in said telephone but the volume thereof will be limited.

No references cited.